United States Patent [19]
Mori et al.

[11] Patent Number: 5,678,074
[45] Date of Patent: *Oct. 14, 1997

[54] POWER FOCUS DEVICE FOR A CAMERA

[75] Inventors: Ryuichi Mori; Keiji Osawa, both of Tokyo, Japan

[73] Assignee: Nikon Corporation, Tokyo, Japan

[*] Notice: The term of this patent shall not extend beyond the expiration date of Pat. No. 5,412,445.

[21] Appl. No.: 771,882

[22] Filed: Dec. 23, 1996

Related U.S. Application Data

[63] Continuation of Ser. No. 384,952, Feb. 7, 1995, which is a continuation of Ser. No. 2,475, Jan. 8, 1993, Pat. No. 5,412,445.

[30] Foreign Application Priority Data

Jan. 10, 1992 [JP] Japan ................ 4-003107

[51] Int. Cl.⁶ ............................ G03B 3/10; G03B 13/34
[52] U.S. Cl. ........................................ 396/131; 396/86
[58] Field of Search .............................. 396/131, 86

[56] References Cited

U.S. PATENT DOCUMENTS

| | | | |
|---|---|---|---|
| 4,025,930 | 5/1977 | Wolff | 354/64 |
| 4,445,757 | 5/1984 | Enomoto et al. | 354/195.12 |
| 4,508,443 | 4/1985 | Matsuzaki et al. | 354/195.1 |
| 4,568,165 | 2/1986 | Matasuzaki et al. | 354/195.1 |
| 4,687,308 | 8/1987 | Ishihashi | 354/195.1 |
| 4,851,869 | 7/1989 | Someya | 354/289.1 |
| 4,857,951 | 8/1989 | Nakajima et al. | 354/195.1 |
| 4,864,344 | 9/1989 | Arakawa et al. | 354/195.1 |
| 4,896,179 | 1/1990 | Watanabe et al. | 354/195.1 |
| 4,972,215 | 11/1990 | Kitamura et al. | 354/195.1 |
| 4,984,000 | 1/1991 | Watanabe et al. | 354/195.1 |
| 5,005,033 | 4/1991 | Miyasaka | 354/289.1 |
| 5,159,366 | 10/1992 | Gell, Jr. | 354/64 |
| 5,412,445 | 5/1995 | Mori et al. | 354/195.1 |

FOREIGN PATENT DOCUMENTS

| | | |
|---|---|---|
| 59-64816 | 4/1984 | Japan . |
| 63-177118 | 10/1992 | Japan . |

*Primary Examiner*—Russell E. Adams
*Attorney, Agent, or Firm*—Morrison Law Firm

[57] ABSTRACT

A power focus device for a camera provides a user-friendly lever interface allowing efficient camera operation. A lever, located outside a camera cover, is movable in two opposing directions but is biased to remain at a neutral position between two extremes of movement. Moving the lever from the neutral position initiates driving the camera lens to focus in either a first or a second direction according to a direction of a displacement of the lever from the neutral position. A speed of focusing is proportional to an amount of displacement of the lever from the neutral position, thus permitting variable high and low speed focusing in both directions for rapid and accurate close-up and infinity focussing. Incorporating a seal into the device permits use in underwater camera applications.

12 Claims, 4 Drawing Sheets

POWER FOCUS DEVICE FOR A CAMERA

This application is a continuation of application Ser. No. 08/384,952, filed Feb. 7, 1995, which is a continuation of application Ser. No. 08/002,475 filed on Jan. 8, 1993, now U.S. Pat. No. 5,412,445.

BACKGROUND OF THE INVENTION

The present invention relates to a power focus device for a camera, and more particularly, to a power focus device for focusing a lens by means of an electric motor drive responsive to a spring biased lever control. The invention is especially useful in underwater camera applications.

Power focus mechanisms having a lens focused by a motor drive mechanism have been proposed employing a variety of control schemes.

Japanese hid-open Patent Publication No. 63-177118 discloses a power focus mechanism employing a rotating control dial. Rotating the control dial generates pulse signals, whose frequency and count are produced in accordance with rotation of the dial. The pulse signals are used to control an electric motor for adjustment of a lens. The direction and speed of adjustment of the lens is controlled by the direction and the speed of rotation of the dial. Such a mechanism necessitates placement of the dial on the outside of the camera so that it may be operated manually. The need to have an exposed rotatable dial makes this approach unsuitable for applications in an underwater camera because during operation, it is necessary to rotate the dial many times in order to achieve a proper focus. Such manual operation results in user fatigue and detracts from the utility of the control mechanism.

Japanese Laid-open Patent Publication No. 59-64816 aim discloses a power focus device using first and second button switches. The lens is focused in a first direction while the first button is depressed and in a second direction while the second button is depressed. Such a control mechanism lends itself to sealing by pliable switch covers. However, such a mechanism does not permit real-time operation of the camera lens. The mechanism has only two switches corresponding to each of the two directions. Each switch drives the lens at a constant speed in its given direction. This speed may be either too slow for large focus adjustments or too fast for fine focus adjustments. Providing dual speeds in each direction offers greater flexibility but complicates the operation of such a control. A user operating a dual speed control must first select one speed to effect a large change in focus and then shift to a slower speed to effect a fine focus adjustment.

Thus, there exists a need for a power focus mechanism that can be easily sealed for applications involving underwater cameras while allowing variable speed operation of the lens focusing mechanism. Furthermore, such a mechanism must provide for ease of manual operation so that focusing may be readily accomplished without subjecting the user to fatigue.

OBJECT AND SUMMARY OF THE INVENTION

An object of the present invention is to provide a power focus device for a camera that overcomes the drawbacks of the prior art.

A further object of the present invention is to provide a power focus device for a camera that provides a user-friendly interface which minimizes fatigue during operation.

A still further object of the present invention is to provide a power focus device for a camera suitable for underwater camera applications.

Briefly stated, the present invention provides a power focus device for a camera having a user-friendly lever interface for efficient camera operation. A lever, located outside a camera cover, is movable in two opposing directions and is biased so as to remain at a neutral position between two extremes of movement. Moving the lever from the neutral position initiates driving the camera lens to focus in either a first or a second direction according to a direction of a displacement of the lever from the neutral position. A speed of focusing is proportional to an amount of displacement of the lever from the neutral position, thus permitting variable high and low speed focusing in both directions for rapid and accurate close-up and infinity focussing. Incorporating a seal into the device permits use in underwater camera applications.

According to an embodiment of the present invention there is provided a power focus device for a camera comprising: a rotatable member capable of rotation within a fixed angular range, a means for biasing the rotatable member in a neutral position allowing rotation in a first and a second direction, a position of the rotatable member within the fixed angular range defining an angle relative to the neutral position, means for outputting an electric signal related to the angle, means for driving the lens to a nearest and an infinite extreme when the rotatable member moves in the first direction and the second direction respectively, and means for varying a driving speed of the means for driving based upon the electrical signal.

According to another embodiment of the present invention there is provided a power focus device for focusing a lens of a camera comprising: means for generating a signal in relation to a position of a first member, means for bilaterally biasing the first member in a neutral position such that the first member may be moved from the neutral position in both a first and a second direction, drive means for driving the lens in a first focusing direction and a second focusing direction, the drive means being responsive to the signal such that the lens is inactive when the first member is in the neutral position, and the drive means being responsive to the signal such that the lens is driven in one of the first focusing direction and the second focusing direction in response to a displacement of the first member from the neutral position in one of the first and second directions respectively.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
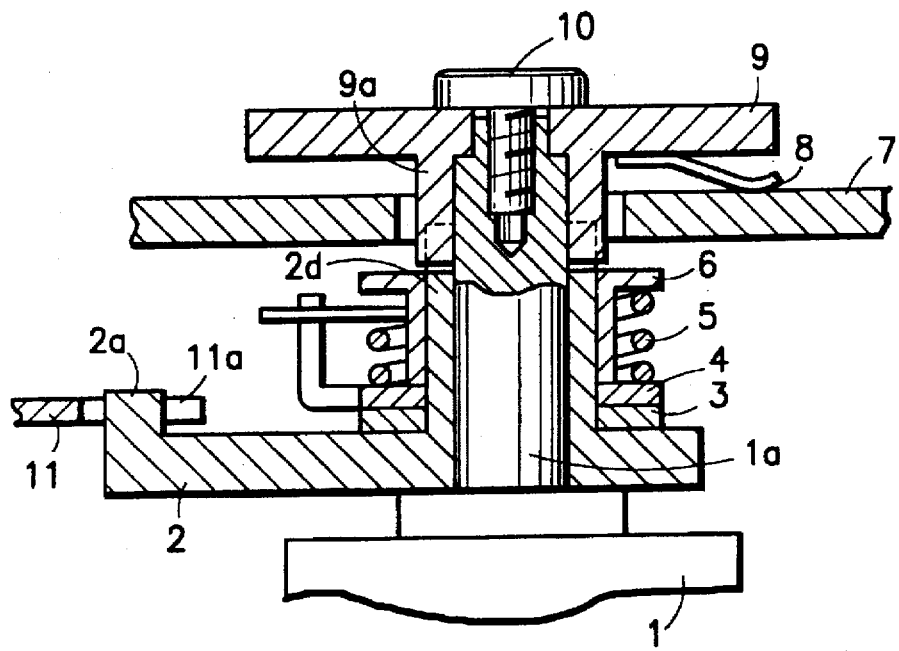
FIG. 1 is a sectional view of a first part of an embodiment of a switch of the present invention.

Referring to FIG. 1, a switch has a first spin lever 2 rotatably mounted on shaft 1a which is integrally formed in a camera body 1. Restricting levers 3 and 4, biased by a spring 5, are situated above first spin lever 2. Spring 5 is secured in place by a collar 6. First spring lever 2 has a cylinder portion 2d extending along shaft 1a. Cylinder portion 2d engages a collar 9a of a brush mount board 9 such that brush mount board 9 rotates with first spring lever 2.

Brush mount board 9 has a brush 8 mounted upon its lower surface. Brush 8 has two contacts which engage printed circuit traces on substrate 7. A cap screw 10 screws into shaft 1a to retain brush mount board 9 and the remainder of the switch assembly. The switch produces an electric signal which is varied by the movement of brush 8 along the surface of substrate 7. The electric signal effects control of an electric motor driving a lens so that lens may be focused.

Figure 2:
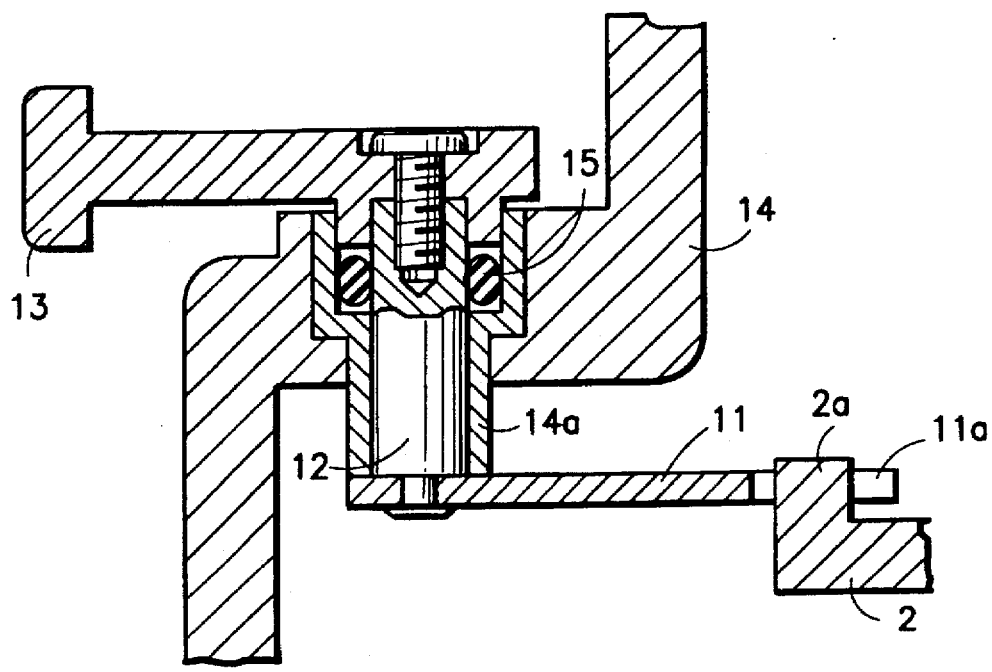
FIG. 2 is a sectional view of a second part of the embodiment of the switch of FIG. 1.

Referring to FIG. 2, first spin lever 2 has a protrusion 2a engaging a yoke end 11a of a second spin lever 11. A first end of a shaft 12 is fixed in an opposing end of spin lever 11. Shaft 12 passes through an aperture in a camera cover 14. An operating lever 13 engages a second end of shaft 12 outside camera cover 14. An O-ring 15 is compressed between shaft 12 and camera cover bushing 14a, sealing passage of shaft 12 through camera cover 14 and preventing leakage of water into camera cover 14. In view of this specification, it would be recognized that other embodiments of the present invention may employ alternative means of sealing such as pliable switch covers, made of rubber or a similar synthetic material, which permit required angular range of motion of operating lever 13.

Deflection of operating lever 13 outside camera cover 14 rotates spin lever 11 inside camera cover 14 which in turn rotates first spin lever 2 by engagement of protrusion 2a with yoke end 11a of spin lever 11.

Referring back to FIG. 1, rotation of first spin lever 2 rotates brush mount board 9 which moves brush 8 on substrate 7. Movement of brush 8 produces an electrical signal for controlling operation of the motor focusing the lens.

Figure 3:
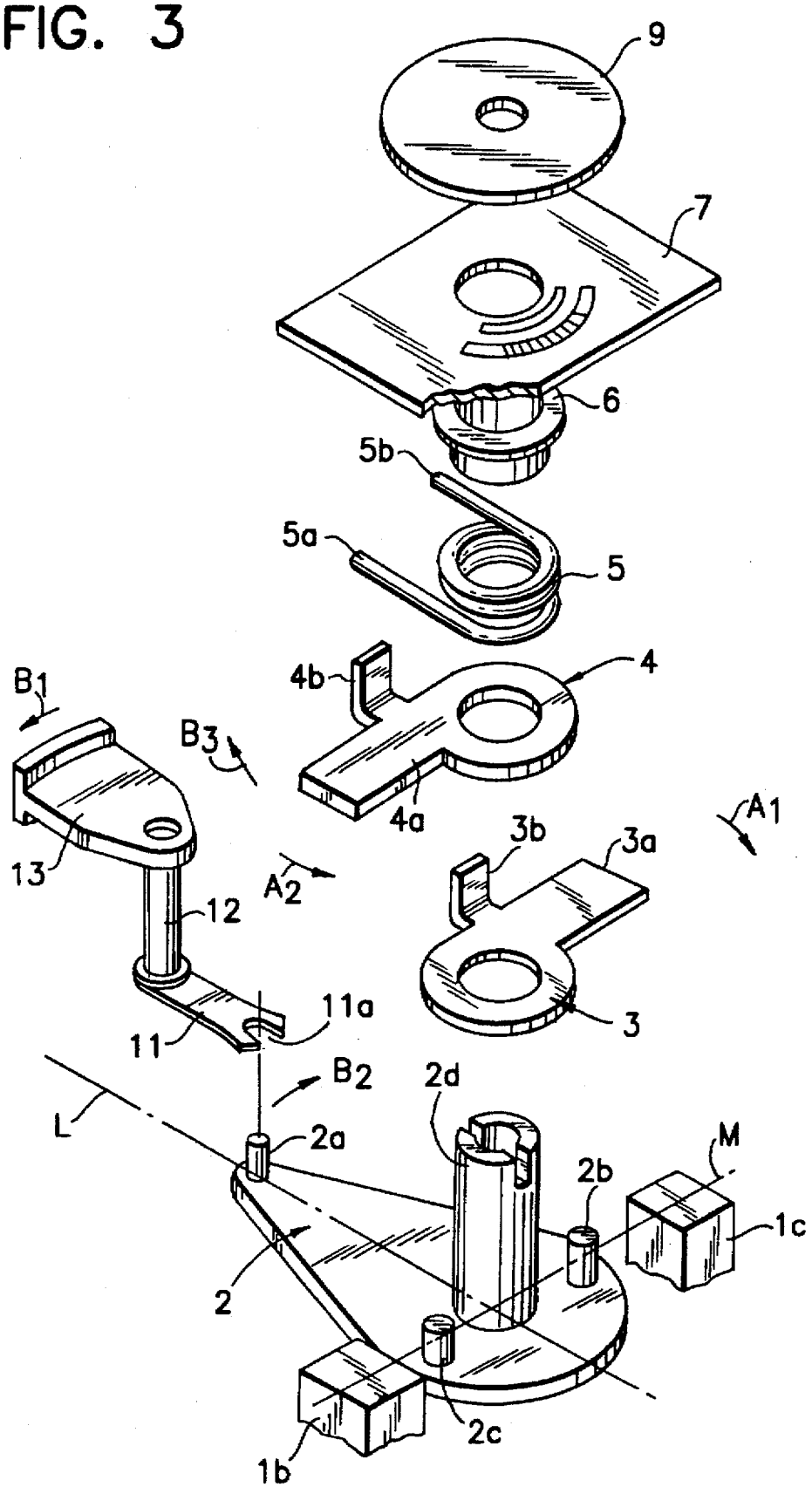
FIG. 3 is an exploded view showing the structure of the switch of the present invention illustrated in FIGS. 1 and 2.

Referring to FIG. 3, first spin lever 2 is biased by spring 5 and restricting levers 3 and 4 so as to remain in a neutral position, as shown in FIG. 3. In the neutral position first spin lever 2 has a center line parallel to line L. Force exerted upon first spin lever 2 by spin lever 11 displaces first spin lever 2 through a limited angular range in either a clockwise or a counter-clockwise direction. Spring 5 returns first spin lever 2 to its neutal position when external force is removed.

Spring 5, with arms 5a and 5b, is situated above restricting levers 3 and 4 biasing first spring lever 2 into a neutral position. Arms 5a and 5b engage tabs 3b and 4b of restricting levers 3 and 4, respectively. Restricting levers 3 and 4 have hand portions 3a and 4a which rest upon stops 1c and 1b, respectively. Stops 1c and 1b are incorporated into the camera body where they serve to restrict the movement of restricting levers 3 and 4 in directions $A_1$ and $A_2$, respectively, keeping hands 3a and 4a parallel to line M. Protrusions 2b and 2c of first spin lever 2 engage hand portions 3a and 4a of restricting levers 3 and 4 when first spin lever 2 is rotated in direction $A_2$ or $A_1$, respectively. The rotation of first spin lever 2, in direction $A_2$, rotates restricting lever 3 so as to compress together arms 5a and 5b of spring 5 producing the bias against the rotation. Similarly, rotation in direction $A_1$ rotates restricting lever 4 compressing arms 5a and 5b of spring 5. Compression of spring 5 produces a force creating a bias against rotation. Thus, first spring lever 2 is biased in the neutral position where its centerline is parallel to line L where line L is orthogonal to line M which passes through the centers of stops 1c and 1b.

Operation of the switch from outside camera cover 14 is accomplished using operating lever 13. Rotating operating lever 13, in a direction of arrow $B_1$, rotates first spin lever 2 in a direction of arrow $B_2$ via second spin lever 11. First spin lever 2 rotates brush mount board 9 displacing brush 8 along substrate 7, thereby producing the electrical signal for controlling the motor. Simultaneously, protrusion 2c moves hand portion 4a in a direction of arrow $B_3$ pressing tab 4b against spring arm 5a for producing the bias against movement. The bias returns first spring lever 2 to the neutral position when force is removed from operating lever 13.

Figure 4:
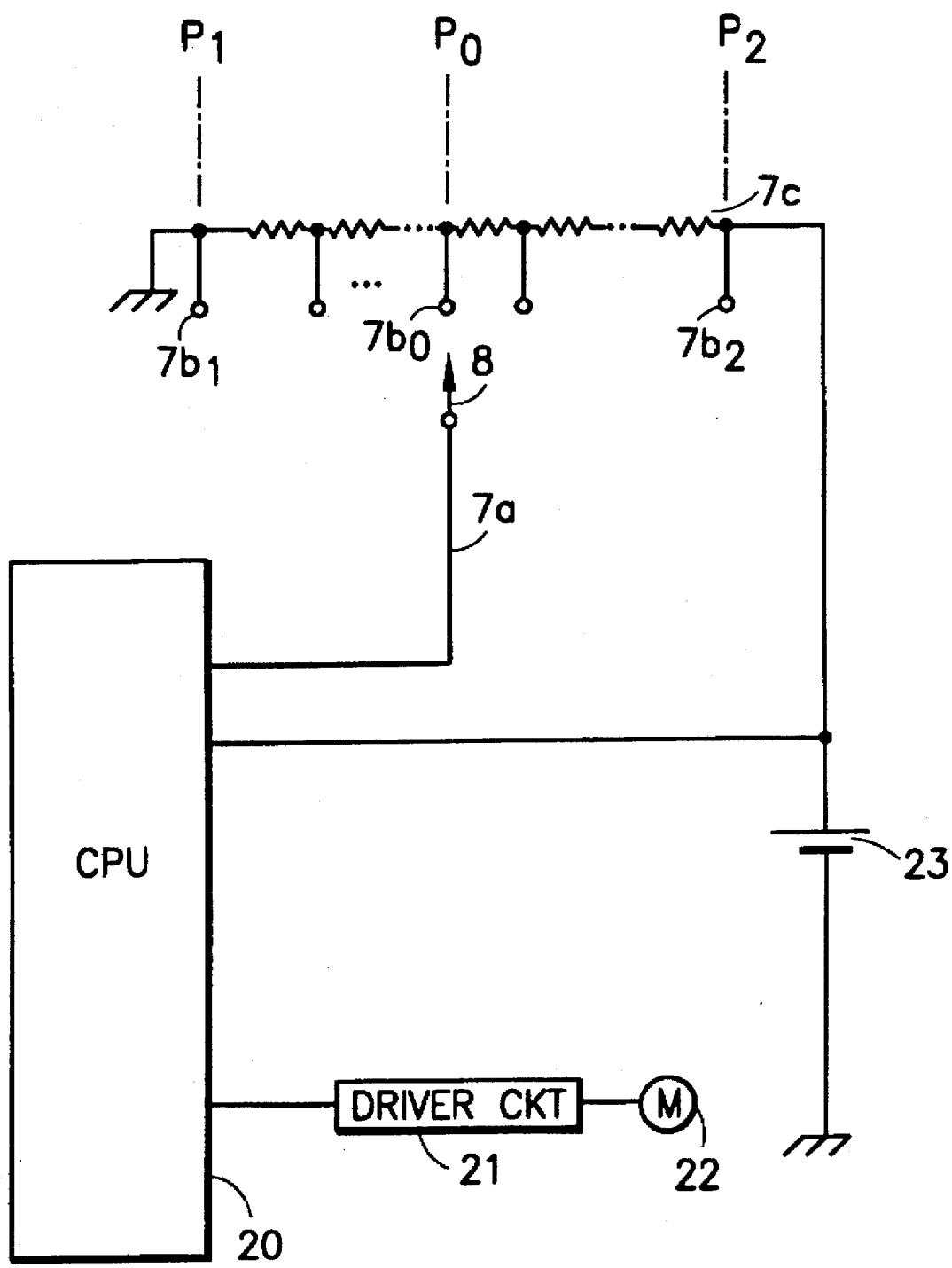
FIG. 4 is a schematic diagram of an embodiment of the present invention.

Referring to FIG. 4, brush 8 is depicted as a multi-position switch connecting line 7a to one of taps $7b_0$ through $7b_2$ that connect to a resistive divider network 7c. Voltage source 23 applies a reference potential to resistive divider network 7c and a central processing unit 20 (hereinafter CPU). Taps $7b_0$ through $7b_2$ supply linearly increasing voltage potentials from resistive divider network 7c, one of which is a selected potential supplied to CPU 20 via line 7a and brush 8. CPU 20 utilizes an A/D converter having voltage source 23 as a reference potential for digital conversion of the selected potential. CPU 20 controls a motor drive circuit 21, in a well known manner, based upon a converted value of the selected potential. Motor drive circuit 21 actuates a motor 22 which drives a lens focusing mechanism. A voltage of half the reference potential is applied to CPU 20 when brush 8 contacts center tap $7b_0$. CPU 20 interprets this selected potential as the neutral position and therefore maintains the focus in its existing state. CPU 20 drives motor 22 rapidly in a first direction when brush 8 contacts tap $7b_2$ because a high potential is applied to CPU 20. Similarly, CPU 20 drives motor 22 rapidly in a second direction when brush 8 contacts tap $7b_1$ since a low potential is selected. Taps between tap $7b_0$ and taps $7b_1$ and $7b_2$ provide selected potentials that drive motor 22 in opposing directions at lower speeds useful when fine focusing is required.

In view of this specification, it is recognized that alternative embodiments of the present invention may employ continuously variable potentiometers or variable resistors to generate selected voltage potentials for use as a motor control signals. Furthermore, it is recognized that alternative embodiments may incorporate a non-linear relationship between switch position and the selected potential, presenting advantages in various applications. Such alternative embodiments are within the scope and spirit of the present invention.

Figure 5:
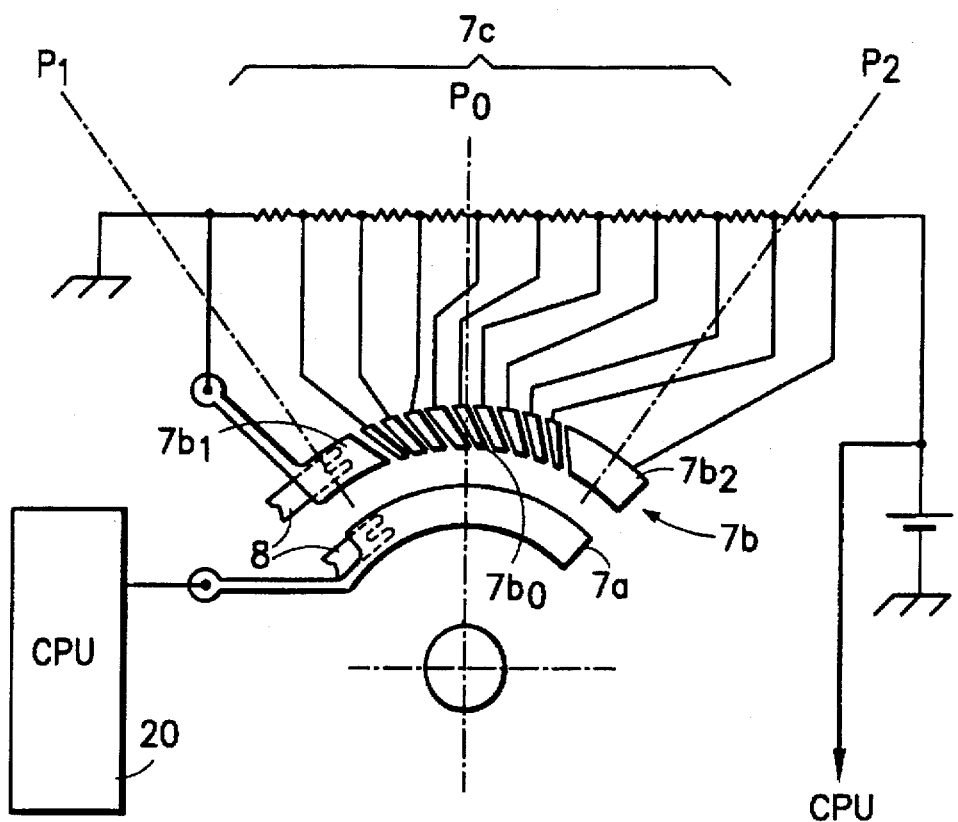
FIG. 5 is a schematic view of a resistive divider network included in a plan view of a substrate circuit layout of an embodiment of the present invention.

Referring to FIG. 5, a schematic view of substrate 7 and brush 8 shows brush 8 having two contacts that ride upon tap pattern 7b and line 7a. Line 7a functions as a pick-up rail. Tap pattern 7b includes taps $7b_0$–$7b_2$ which connect to resistive divider network 7c. Movement of brush 8 connects a tap to the pick-up rail pattern, thereby applying the selected potential to line 7a and CPU 20. Resistance to ground at taps $7b_0$–$7b_2$ varies linearly with the position of brush 8 therefore producing a linearly increasing selected potential. Connection of brush 8 to one of tap $7b_1$ and tap $7b_2$ provides a minimum and a maximum value of the selected potential, respectively, initiating rapid motor operation in one of a first and a second direction.

The operation of the switch provides a minimum and maximum selected potential when contacts of brush 8 are aligned on lines $P_1$ and $P_2$, respectively. First spin lever 2 is located at the neutral position when the contacts of brush 8 are on a line $P_0$, where the resistance to ground is half the maximum value and the selected potential is one half of the reference potential. The resistance to ground and the selected potential is reduced, as brush 8 is moved in a direction towards line $P_1$, the lens moves toward a first extreme focus position, for example the near focus position. Likewise, when the resistance to ground and the selected potential is increased, as brush 8 is moved in a direction to line $P_2$, the lens moves toward a second extreme focus position, for example the furthest or infinity focus position. Motor speed increase with the amount of displacement of brush 8 from line $P_0$.

The mechanism of the present invention provides a user-friendly interface with the camera wherein both speed and direction of focus may be controlled by a single lever, operating lever 13. This operation produces an ergonomically efficient means of focusing the lens providing for ease of operation and reduced user fatigue.

Figure 6:
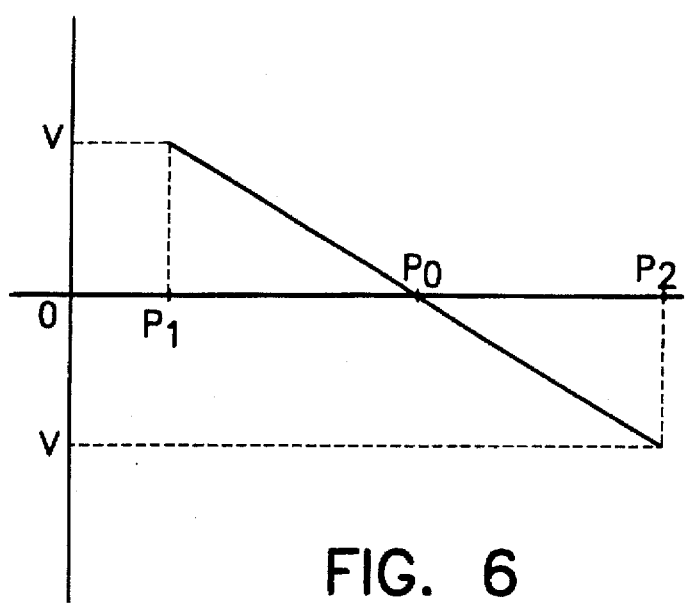
FIG. 6 is a graph showing the relationship between a driving direction and velocity and a position of brush contacts on the resistive divider network of FIG. 5.

Referring to FIG. 6, a characteristic of a focussing velocity v as a function of a position of brush 8 between $P_1$ and $P_2$, as depicted in FIG. 5, is shown to be linear. When brush 8 moves to positions $P_1$ and $P_2$ the lens is focused at a corresponding maximum speed, approaching the near and infinity focus extremes respectively.

It is recognized in view of this specification that alternative embodiments of the present invention include a brush directly contacting either a linear or a non-linear resistive pattern, such as those employed in cermet potentiometers. Furthermore, it may be realized by one skilled in the art, in light of this specification, that an electrical signal for use in the present invention may be alternatively generated by means of a variable electric component wherein a resulting varied electrical condition is sensed by a CPU. Embodiments further include the variable electric component operating in a linear slide mode or other mechanical arrangements. Additionally, while a CPU 20 is used in the preferred embodiment, other embodiments of the present invention may employ alternative digital or analog control means.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power focus device for a lens of a camera comprising:

a rotatable member;

a voltage divider between a first and second reference voltage;

said voltage divider having at least first, second, third, fourth, and fifth terminals;

said rotatable member including a switch selectively connectable to any one of said first, second, third, fourth, or fifth terminals;

a central processing unit;

an output of said switch being connectable to an input of said central processing unit;

a lens driver circuit;

said central processing unit producing a signal for driving said lens driving circuit;

a resilient member biasing said switch to a neutral position in contact with said third terminal and permitting rotation thereof from said neutral position in a first and a second direction within a fixed angular range;

said central processing unit maintaining a position of said lens when said switch is in said third position;

said lens driving circuit driving said lens in a first focussing direction at a slow and a fast speed when said switch moves in said first direction and contacts said second and first terminals, respectively;

said lens driving circuit driving said lens in a second focussing direction at a slow and a fast speed when said switch moves in said second direction and contacts said fourth and fifth terminals, respectively.

2. A power focus device for a camera according to claim 1, wherein:

said camera includes a camera cover;

said rotatable member includes an inside member inside said camera cover; and said rotatable member includes a user accessible portion outside said camera cover effective for rotating said inside member.

3. A power focus device for a camera according to claim 1 wherein said speed that said lens driving circuit drives said lens is responsive to an angle of said rotatable member from said neutral position.

4. A power focus device for focusing a lens of a camera comprising:

a first switch member;

a voltage divider between a first and second reference voltage;

said voltage divider having at least first, second, third, fourth, and fifth terminals;

said first switch member selectively connectable to any one of said first, second, third, fourth, or fifth terminals;

a central processing unit;

an output of said switch being connectable to an input of said central processing unit;

a lens driver circuit;

said central processing unit producing a signal applied to said lens driving circuit;

a resilient member biasing said first switch member to contact said third terminal;

said resilient member permitting movement of said first switch member in first and second opposed directions from said third terminal;

said lens driving circuit inactivating said power focus device when said first switch member is connected to said third terminal;

said lens driving circuit driving said lens in a first focusing direction in response to displacement of said first switch member from said third terminal in said first direction, whereby said first switch member is connected to one of said first and said second terminal.;

said lens driving circuit driving said lens in said second focusing direction in response to displacement of said first switch member from said third terminal in said second direction, whereby said first switch member is connected to one of said fourth and fifth terminals;

said third terminal of said first switch member corresponding to an output of said voltage divider between a minimum and maximum output of said voltage divider; and said lens driving circuit being further responsive to an amount of motion of said first switch member in said first and second directions to control a speed of driving of said lens in the respective directions.

5. A power focus device for focusing a lens of a camera according to claim 4 wherein a speed of focusing varies in relation to an amount of displacement of said first switch member from said third terminal.

6. A power focus device for focusing a lens of a camera according to claim 5 wherein said speed of focusing is linearly related to said amount of displacement.

7. A power focusing device for focusing a lens of a camera according to claim 4 further comprising:

a lever operably linked to said first switch member from a position outside said camera cover through said camera cover to permit said displacement of said first switch member; and a seal preventing fluids from entering said camera cover.

8. A power focus device for focussing a lens of a camera according to claim 7 wherein:

said lever includes a shaft passing through said camera cover; and said seal includes a pliable switch cover mounted on said camera cover over said lever.

9. A power focusing device for focusing a lens of a camera comprising:

a movable switch member accessible from outside said camera;

a voltage divider between a first and second reference voltage;

said voltage divider having at least first, second, third, fourth, and fifth terminals;

said movable switch member selectively connectable to any one of said first, second, third, fourth, or fifth terminals;

a central processing unit;

an output of said movable switch member being connectable to an input of said central processing unit;

a lens driver circuit;

said central processing unit producing a signal applied to said lens driving circuit;

said lens driver circuit focusing said lens in first and second directions in response to a direction of said bidirectional motion such that said lens driver circuit is controlled by a direction of actuation of said movable switch member;

said lens driver circuit does not focus said lens when said movable switch member is connected to said third terminal; and said third terminal corresponding to an output of said voltage divider between a minimum and a maximum value of said voltage divider.

10. A power focus device for focusing a lens of a camera according to claim 9 further comprising a resilient member biasing said movable switch member to said third terminal.

11. A power focusing device for focusing a lens of a camera according to claim 9 wherein a speed of said focusing is responsive to an amount of displacement of said movable switch member.

12. A power focus device for focusing a lens of a camera according to claim 11 wherein said speed of focusing is responsive to a state of said variable electrical component.

* * * * *